US006301280B1

(12) United States Patent
Broutin et al.

(10) Patent No.: US 6,301,280 B1
(45) Date of Patent: Oct. 9, 2001

(54) APPARATUS AND METHOD FOR FORMING A LASER CONTROL SIGNAL, AND A LASER INCLUDING THE APPARATUS

(75) Inventors: Scott L. Broutin, Kutztown; James Kevin Plourde, Allentown; John William Stayt, Jr., Schnecksville, all of PA (US)

(73) Assignee: Agere Systems Optoelectronics Guardian Corp., Allentown, PA (US)

( * ) Notice: Subject to any disclaimer, the term of this patent is extended or adjusted under 35 U.S.C. 154(b) by 0 days.

(21) Appl. No.: 09/228,361

(22) Filed: Jan. 11, 1999

(51) Int. Cl.$^7$ .................................................. H01S 3/00
(52) U.S. Cl. ................................. 372/38.01; 372/29.01
(58) Field of Search ................................ 372/29.01, 38.01

(56) References Cited

U.S. PATENT DOCUMENTS

| | | |
|---|---|---|
| 4,901,306 | 2/1990 | Gardner . |
| 4,912,526 | 3/1990 | Iwaoka et al. . |
| 4,914,662 | 4/1990 | Nakatani et al. . |
| 5,084,884 | 1/1992 | Terada . |
| 5,099,144 | * 3/1992 | Sai ....................................... 250/551 |
| 5,384,799 | 1/1995 | Osterwalder . |
| 5,428,700 | 6/1995 | Hall . |
| 5,764,678 | 6/1998 | Tada . |
| 5,786,915 | 7/1998 | Scobey . |
| 5,832,014 | 11/1998 | Johnson . |
| 6,134,253 | * 10/2000 | Munks .................................... 372/38 |

OTHER PUBLICATIONS

Tidrow et al., "A high strain two–stack two–color quantum well infrared photodetector", Appl. Phys. Lett. 70(7):859–861, Feb. 1997.
Chen et al., "Two–color corrugated quantum–well infrared photodetector for remote temperature sensing", Appl. Phys. Lett. 72(1):7–9, Jan. 1998.
1998 Santec Component Series, pp. 1–11.
Wavelength–Selected (D2526G) Laser 2000 Direct Modulated Isolated DFB Laser Module, Lucent Technologies, Bell Labs Innovations, Aug. 1997, pp. 1–8.
Wavelength Locker Test Report, JDS Fitel, Dec. 4, 1997, pp. 1–3.
Nortel Networks: Optical Networking/Transport, Nov. 18, 1998, pp. 1–3.
Broadband: Product Portfolio—Utility Networks, Nortel, Nov. 18, 1998, pp. 1–2.
News Letter, 32ch Tunable Laser Light Source System, Nov. 18, 1998, p. 1.
New Letter, Optical Variable Attenuator, OVA–630, Nov. 18, 1998, p. 1.
Components for DWDM Systems, Santec, Laser Focus World, Oct. 1998, p. 70.

* cited by examiner

Primary Examiner—Teresa M. Arroyo
Assistant Examiner—Gioacchino Inzirillo
(74) Attorney, Agent, or Firm—Duane Morris & Heckscher LLP; Steven E. Koffs

(57) ABSTRACT

A wavelength stabilized laser system includes a laser that produces a laser light. The laser light has an amplitude and a wavelength that vary with the laser temperature. A first detector provides a first signal representing the amplitude of the laser light. A filter has a gain that is a function of the wavelength of the laser light. The filter receives the laser light and outputs a filtered light having an amplitude that varies with the wavelength of the laser light. A second detector provides a second signal representing the amplitude of the filtered light. A transformer has a primary and a secondary. The primary is electrically coupled to the first and second detectors. The primary of the transformer includes a first coil connected to the first detector and a second coil connected to the second detector. The first and second coils of the primary are opposite in polarity from each other. Thus, the secondary has a voltage that is proportional to the difference between the voltages of the first and second detectors. A controller is coupled to the secondary. The controller controls the wavelength of the laser based on a voltage of the secondary of the transformer.

27 Claims, 3 Drawing Sheets

APPARATUS AND METHOD FOR FORMING A LASER CONTROL SIGNAL, AND A LASER INCLUDING THE APPARATUS

FIELD OF THE INVENTION

The present invention is related to the field of wavelength stabilized laser systems.

DESCRIPTION OF THE RELATED ART

The wavelength stabilized laser is a recently developed component of dense wavelength division multiplexed (DWDM) systems. In a DWDM system, a single semiconductor laser device may be used to provide light at several predetermined wavelengths (each corresponding to a different channel.) Commercial devices have been produced with 100 gigahertz spacing. If it becomes necessary to add further channels to an existing optical fiber, even denser wavelength spacing may be used in the future. As the wavelength spacing decreases, wavelength stabilization takes on a more important role.

U.S. Pat. No. 5,832,014 to Johnson, which is assigned to Lucent Technologies Inc., is incorporated herein by reference in its entirety for its teachings on wavelength stabilization in tunable semiconductor lasers.

It is common to include a filter in a feedback control loop for the laser device. The filter has a gain that varies with the wavelength of the laser light. A first photodetector measures the laser light before the light enters the filter, and a second photodetector measures the filtered light exiting the filter. A high gain differential amplifier provides an amplified difference signal proportional to the difference between the output of the first photodetector and the output of the second photodetector. The amplified difference signal is used to control the laser wavelength (by adjusting a temperature controller or a bias signal that is transmitted to the laser).

The differential amplifier is an active component that may exhibit temperature dependencies, aging or other disadvantages. A method for overcoming these disadvantages is desired.

SUMMARY OF THE INVENTION

The invention is a system and method for controlling, a laser. The amplitude of a laser light output by the laser is detected. The laser light is filtered and a filtered light is output. The filtered light has an amplitude that varies with the wavelength of the laser light. The amplitude of the filtered light is detected. Signals representing the amplitude of the laser light and the amplitude of the filtered light are provided to a primary of a transformer. The wavelength of the laser is controlled based on a voltage of the secondary of the transformer.

DETAILED DESCRIPTION

Figure 1:
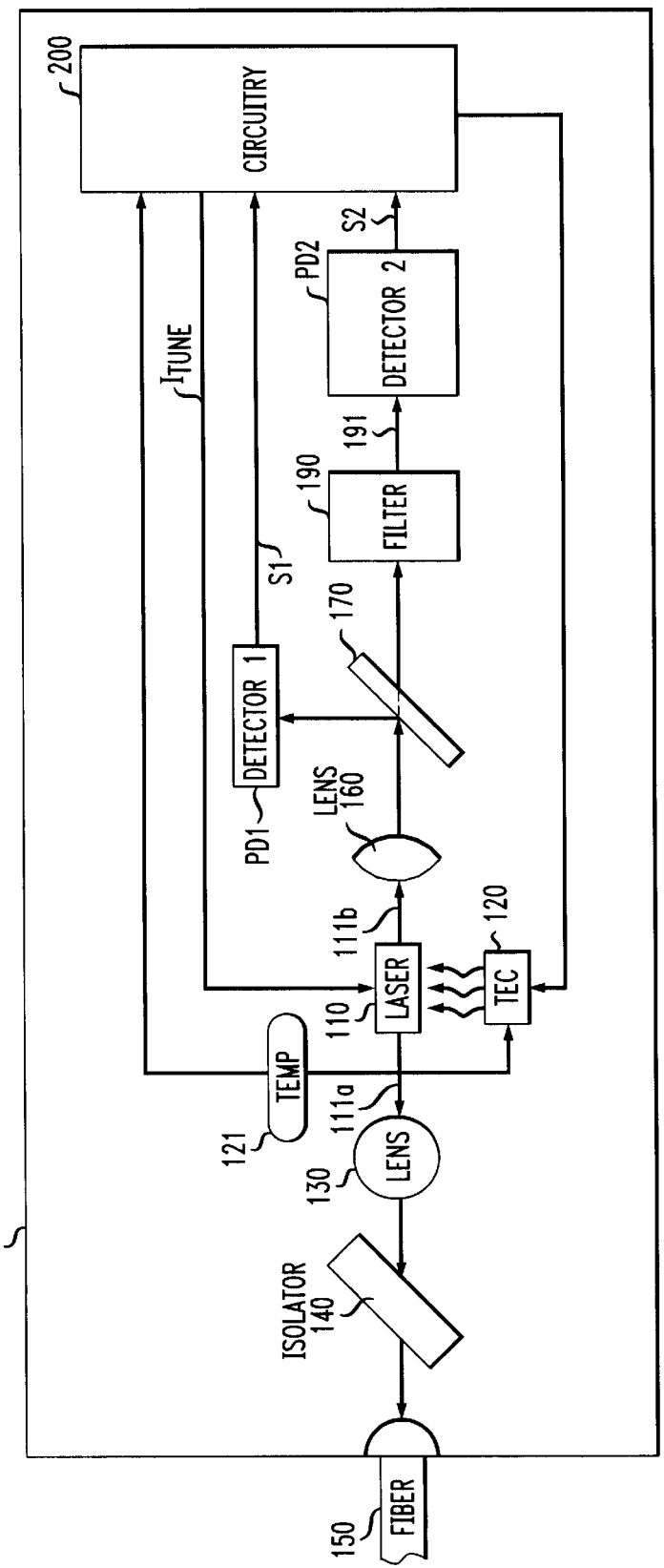
FIG. 1 is a block diagram of a laser system including an apparatus according to the invention.
Figure 2:
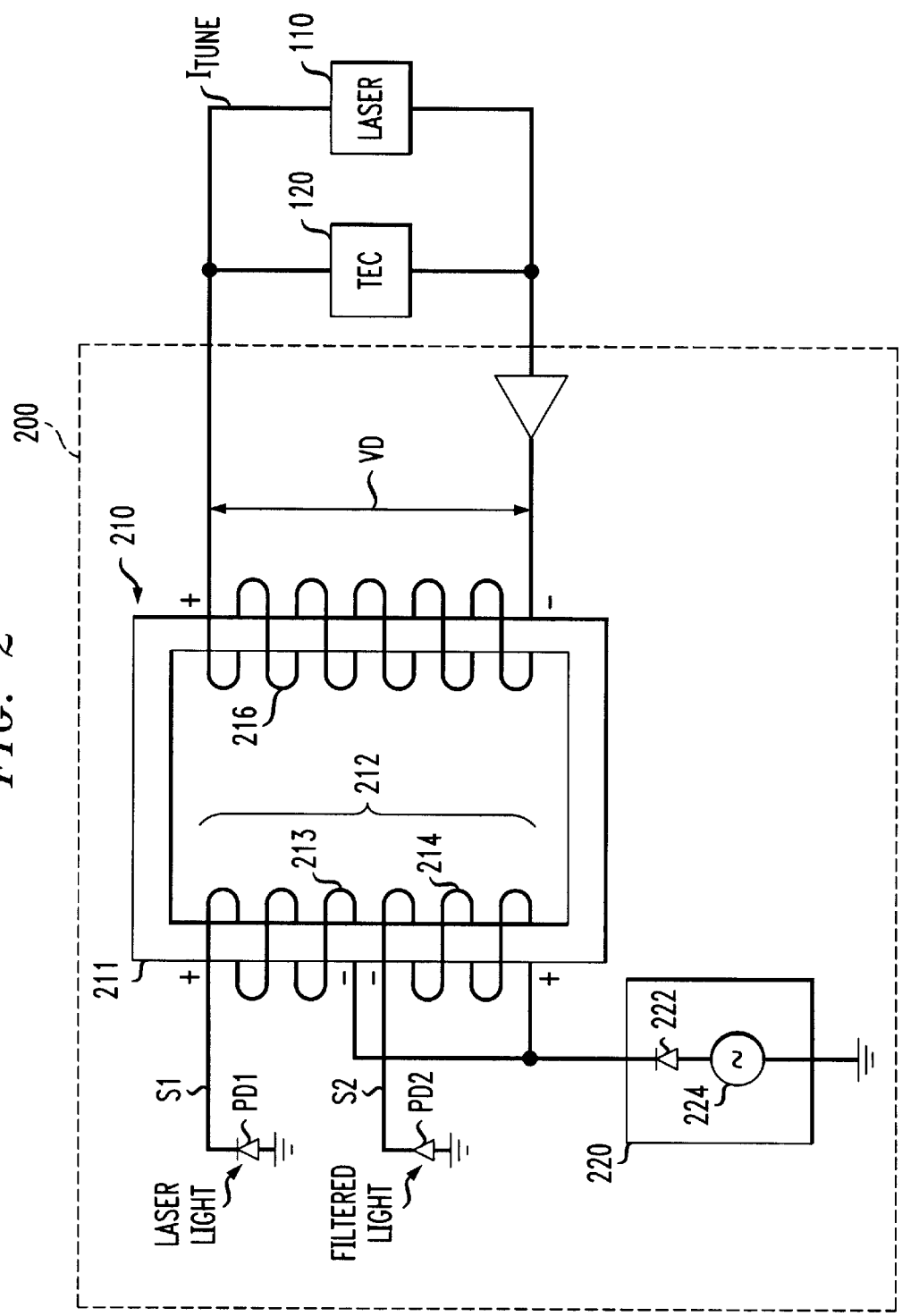
FIG. 2 is a schematic diagram of the circuitry block shown in FIG. 1.

FIGS. 1 and 2 show an exemplary laser apparatus in accordance with the invention. The wavelength stabilized laser system 100 includes a laser 110 that produces a laser light 111b having an amplitude and a wavelength that vary. A first detector PD1 provides a first signal S1 representing the amplitude of the laser light 111b. A filter 190 has a gain that is a function of the wavelength of the laser light 111b. The filter 190 receives the laser light 111b and outputs a filtered light 191 having an amplitude that varies with the wavelength of the laser light 111b. A second detector PD2 provides a second signal representing the amplitude of the filtered light 191. A transformer 210 has a primary 212 and a secondary 216. The primary 212 is electrically coupled to the first and second detectors PD1 and PD2. A controller 120 is coupled to the secondary 216. The controller 120 controls the wavelength of the laser 110 based on a voltage VD of the secondary 216 of the transformer 210.

Referring now to FIG. 1, the wavelength stabilized laser system 100 includes a laser 110 that transmits a laser light 111a from the front and a laser light 111b from the backface of laser 110. The laser light 111a is transmitted through a focusing lens 130 and optical isolator 140, to an optical fiber 150. The isolator 140 prevents transmission of light back from the fiber 150 into the laser 110. Isolator 140 may be a conventional isolator providing at least about 30 dB of attenuation. The laser lights 111a and 111b have the same wavelength, so that the properties of laser light 111a are determined and controlled by monitoring light 111b.

To monitor the wavelength of laser light 111b, laser system 100 uses a filter 190, that receives the laser light and outputs a filtered light 191 having an amplitude that varies with the wavelength of the laser light 111b. More specifically, the filter 190 has a gain that is a function of the wavelength of the laser light 111b. The filter 190 may be, for example, a conventional etalon or an edge of crossing filter, band pass filter, low pass filter, high pass filter, comb filter or the like.

The filtered light 191 is used to provide feedback that is used to stabilize the frequency of the laser light 111b. More specifically, because the amplitude of the filtered light 191 is approximately equal to the amplitude of the laser light when the laser wavelength is equal to the desired channel wavelength. By monitoring the difference between the laser light and the filtered light, a feedback signal may be determined.

The laser 100 may be a of a conventional type, such as a distributed feedback (DFB) laser, or a distributed Brag reflector (DBR) laser, or the like. The wavelength of the laser light 111b generated by these laser types is a function of the temperature of the laser 100. (The wavelength of a DBR laser is a function of both the temperature and a bias signal that is provided to the Brag reflector section of the DBR laser.) Thus, temperature adjustments may be used to adjust the wavelength of either a DFB or DBR laser.

In the exemplary embodiments, the temperature control device (which may be, for example, a thermoelectric cooler (TEC) 120), is thermally coupled to the laser 110 to control the temperature of the laser. The TEC 120 may be adjacent to the laser, as shown in FIG. 1, or may be mounted outside of the housing 101 (not shown). Because the entire package may be quite small, it is possible to have a high thermal conductance between the laser 110 and the TEC 120, even if the TEC 120 is not abutting the laser 110. The TEC allows heating and cooling of the laser 110. Alternative heating devices may include a resistance heater (not shown).

A focussing lens 160 focuses the laser light 111b. A beam splitter 170 deflects a portion of the laser light 111b onto a first detector PD1. Detector PD1 may be, for example, a conventional P-I-N (positive-intrinsic-negative) diode, which may be, for example, an InGaAs, InP, or InAs type diode. Other suitable photodetectors may be used. The first detector PD1 receives the portion of the laser light 111b from the beam splitter 170 and provides a first signal S1 representing the amplitude of the laser light 111b.

The remainder of the laser light 111b that is not deflected by beamsplitter 170 is transmitted through beamsplitter 170 and filter 190. A second detector PD2, which may also be a P-I-N diode or other photodetector, provides a second signal S2 representing the amplitude of the filtered light 191. As described above, during normal operation of the laser 110, the difference between the filtered light 191 and the amplitude of the laser light 111b is determined based on the output signals S1 and S2 of the two diodes PD1 and PD2, respectively.

A temperature detector 121 provides temperature information that may be used to control TEC 120, or to update the calibration of TEC 120. The temperature detector 121 may be, for example, a thermistor.

FIG. 2 shows the circuitry block 200 of FIG. 1 in greater detail. According to the invention, a transformer 210 has a primary 212 and a secondary 216. The primary is electrically coupled to the first and second detectors PD1 and PD2. The primary 212 of the transformer 210 includes a first coil 213 connected to the first detector PD1 and a second coil 214 connected to the second detector PD2. The first coil 213 and the second coil 214 of the primary 210 each have the same number of windings $N_P$, but are opposite in polarity from each other. Thus, the primary 212 of the transformer 210 has a magnetic flux that is proportional to the difference between the output voltage of the first detector PD1 and the output voltage of the second detector PD2. The transformer 210 and its core 211 are selected to reduce coupling between the detectors PD1 and PD2.

The rate of change of flux is nearly equal in the primary 212 and the secondary 214. Thus, the voltage VD induced in the secondary 216 is approximately $(S2-S1)*N_S/N_P$, where S1 and S2 are the voltages from detectors PD1 and PD2, respectively, $N_S$ is the number of turns in the secondary 216, and $N_P$ is the number of turns in the primary. With this simple relationship, the gain of transformer 210 is determined by the ratio of $N_S/N_P$, and is insensitive to temperature. The turns ratio $N_S/N_P$ of the transformer 210 is adjusted for suitable transformation from the non-filtered detector signal PD1 and filtered detector signal PD2 to the control signal VD. The turns ratio $N_S/N_P$ of the transformer 210 also provides a simple mechanism to apply gain to the detector signals.

The difference voltage signal VD is used by the controller 120 to determine the magnitude and direction of deviation of the wavelength of laser 110 from the desired value and adjusts the temperature of the laser accordingly. This adjustment process occurs on a continuous, steady-state basis to achieve a stabilized wavelength.

The exemplary transformer 210 may be, for example, a thin film transformer, a magnetic core, or a microfabricated toroidal planer inductor and transformer using ultraviolet based photolithography.

Use of a transformer 210 instead of an active amplifier has other advantages. Losses due to heat and eddy effect are canceled in the primary 212 and nearly zero in the secondary 216. This is particularly desirable for a laser 110 having a wavelength that is sensitive to temperature changes. The transformer 210 is a passive device that does not require any external power. The gain of the transformer 210 is not subject to aging or drift.

If desired, an active amplifier 230 may be added on the secondary side of the transformer 210. The amplifier 230 has an input connected to the secondary 216 of the transformer 210 and an output connected to the controller 120. The active amplifier 230 can add gain, and/or integrate, and/or differentiate the control signal VD.

The controller may be TEC 120. The controller 120 controls the wavelength of the laser 110 based on the voltage of the secondary 216 of the transformer 210. If the secondary 216 of transformer 210 cannot provide enough drive for the TEC 120 (or other heater) the additional gain stage 230 may be desired. Using an active device 230 (which may be, for example an operational amplifier) on the secondary side of the transformer 210 does not increase the sensitivity to temperature, because the difference between S1 and S2 is determined on the primary side of the transformer; it is the difference calculation that is most sensitive to component drift. On the secondary side of the transformer 210, the signal levels are high relative to S1 or S2. Amplifier 230 may be used to raise the control signal up into the hundreds of milliamps—a current range in which conventional thermoelectric coolers operate.

The circuitry 200 may also include a controller such as a microcontroller with analog to digital converters or conventional analog circuitry. The circuitry 200 can use the signal S1 or S2 from detector PD1 or PD2 to normalize the control signal VD to the optical output of the laser. The microcontroller may occupy the position shown by processor 277 and discussed below with reference to FIG. 3.

One of ordinary skill recognizes that a transformer requires an alternating voltage (AC) signal to operate. Because the detectors PD1 and PD2, are not performing coherent detection, the phase of the AC modulation is not important for the laser assembly. The detectors are exposed to a series of "1" s and "0" s in the optical data stream transmitted by laser light 111a. However, conventional communications protocols limit the number of consecutive "1" s or consecutive "0" s in the data stream. If too many consecutive "0" s occur, a "1" is inserted. If too many consecutive "1" s occur, a "0" is inserted. Thus, the detectors PD1 and PD2 are exposed to a continuous change between a logic-high signal and a logic-low signal. This may provide enough modulation for the transformer 210 to function.

FIG. 2 shows a circuit 220 which may also be included in the circuitry 200 to provide modulation. The optional circuit 220 may be a full wave or a half wave oscillator. FIG. 1 shows a half wave oscillator 222, which includes an AC source 224 and a diode 222. One of ordinary skill can readily construct a simple full wave oscillator circuit (not shown) using, for example, an AC source and four diodes connected in a well known "diamond" configuration. Other types of oscillators (e.g., an RC circuit) may also be used.

Optionally, the oscillator 220 that performs the modulating step may be dithered to determine a local slope of a wavelength deviation.

Figure 3:
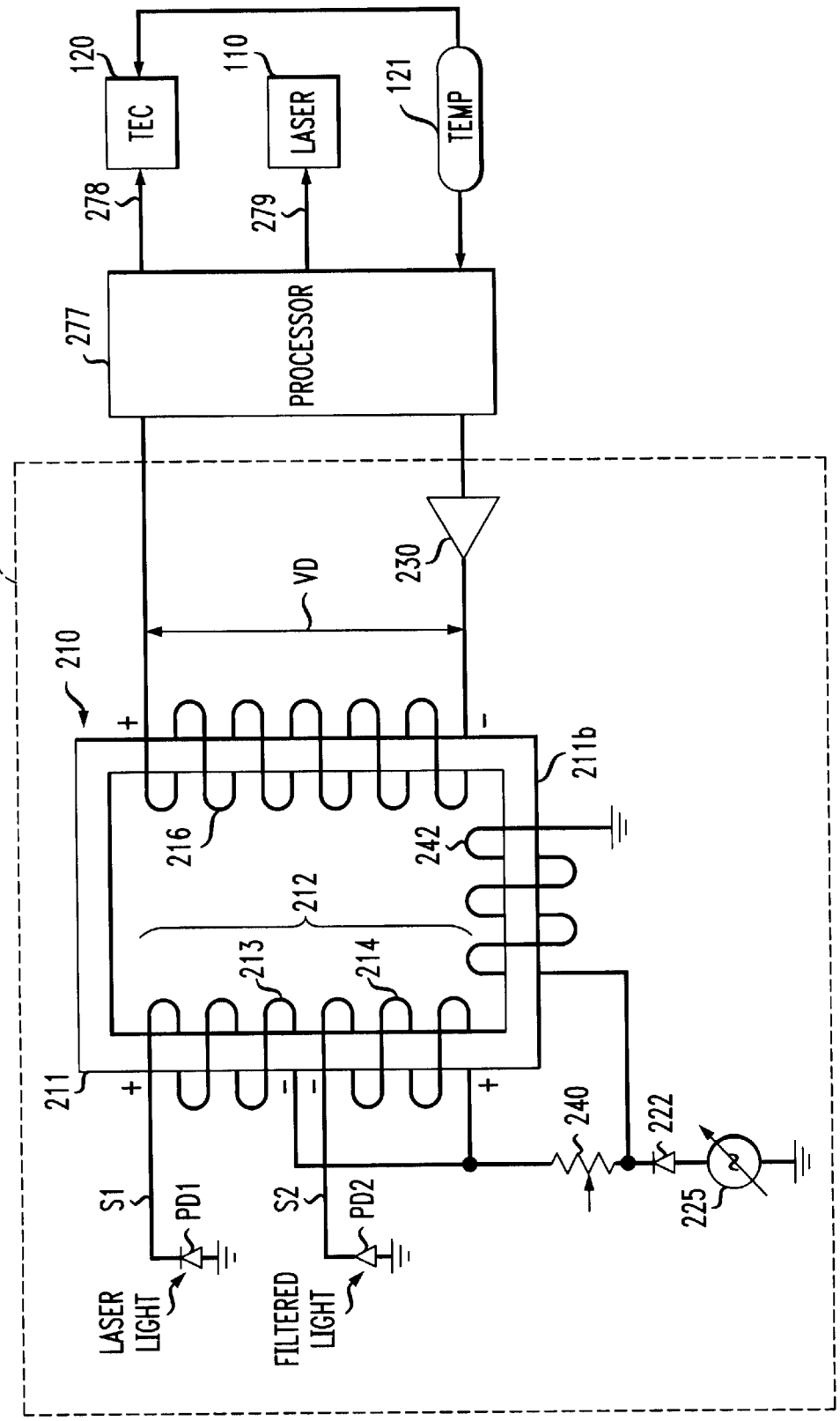
FIG. 3 is a schematic diagram of a variation of the circuitry shown in FIG. 2.

FIG. 3 shows a variation of the circuitry 200 of FIG. 2. In FIG. 3, the circuitry 200' includes several elements that are identical to those shown in FIG. 2. These elements are identified by the same reference numerals in FIG. 3 as in FIG. 2, and are not described in detail herein.

Circuitry 200' includes an additional winding 242 on a portion 211b of the transformer 210 other than the primary 212 or the secondary 216. A voltage source applies an offset voltage to the additional winding 242 to effect a gross temperature change in the laser, as explained in detail below. The voltage source 225 is a variable voltage source, and a variable resistor 240 is provided.

The additional winding 242 on the bottom leg 211b of the transformer 210 provides a separate signal to effect a gross change in the temperature of the laser 110. For example, assume that the laser 110 is capable of operating in any of several different channels, depending on the temperature of the laser 110. To warm the laser 110 up by 10 degrees (to move from channel 1 to channel 2, to channel 3, to channel 4, and to stay at channel 5, additional winding 242 could be used to input extra drive current in addition to the difference signal from PD1 and PD2. The additional winding makes it easy to quickly add a fixed current offset to move between channels. Once the system 200' warms up to the temperature range of the desired channel, the feedback control from the difference between S1 and S2 keeps the system at the desired wavelength.

Similarly, the additional winding 242 may be used to inject power into the system to overcome changes in the ambient temperature. If the ambient temperature drops, additional current may be injected into coil 242. One of ordinary skill could readily construct a lookup table of offset voltages, including a respective offset voltage for each of a plurality of ambient temperature values.

An additional benefit of having the extra winding 242 is that it allows the quantization of the difference signal to be about constant, regardless of whether the system is operating in steady-state at a single channel or transitioning between channels. In other words, if, for example, the maximum difference signal in steady-state is about 0.5 volts, and about 2 volts are required to transition the laser from channel 1 to channel 5, then a 2.5 volt range would be required. Given a 2.5 volt range, the 0.5 volts, of the difference signal could only account for 0.5/2.5=about 20% of the quantization levels. By in inputting the 2.0 volt for the steady-state difference signal levels. One of ordinary skill could readily construct a lookup table of offset voltages, including a respective offset voltage for each of a plurality of channels. Because each voltage corresponds to a respective temperature offset, this can effectively be used to select a channel (wavelength) from a plurality of channels (wavelengths).

Although FIG. 3 shows a half-wave oscillator, one of ordinary skill recognizes that a full wave oscillator may also be used. Further, different oscillator circuits may be substituted.

FIG. 3 also shows a processor 277 interposed between the secondary 216 of transformer 210 and the laser 110 and TEC 120. Processor 277 provides greater flexibility in implementing algorithms to control the laser 110 and TEC 120 based on the output voltage VD of the transformer 210. For example, proportional integral derivative (PID) control and/or fuzzy logic control algorithms may be used. These algorithms may also use the temperature provided by detector 121. Alternatively, the temperature may only be used for a safety cutoff feature of the TEC 120; if the temperature from detector 121 rises above a threshold, the TEC 120 either shuts off or begins cooling automatically, regardless of the voltage signal VD from transformer 210. The processor 277 can use the signal S1 or S2 from detector PD1 or PD2 to normalize the control signal to the optical output of the laser.

FIG. 3 shows a processor 277 which receives the voltage VD from transformer 210. One of ordinary skill in the art understands that the voltage signal VD may be electrically filtered and amplified, and may be converted from analog to digital format, before being transmitted to processor 277. Processor 277 generates and transmits (to TEC 120) a control signal 278 based on the difference signal VD. TEC 120 adjusts the temperature of the laser 110 to regulate the laser wavelength. If laser 110 is a DBR laser, processor 277 also generates and transmits (to laser 110) a bias signal 279 for controlling the wavelength of the laser.

Processor 277 may be a microprocessor or microcontroller, or an application specific integrated circuit (ASIC). Processor 277 feeds back a control signal 278 to the TEC 120, and in the case of a DBR laser, may also adjust the bias signal provided to the laser, based on the voltage VD. In a variation of the exemplary embodiment, the processor may be external to the housing 101, and may be, for example, the processor of a general purpose computer.

Although the invention has been described in terms of exemplary embodiments, it is not limited thereto. Rather, the appended claim should be construed broadly, to include other variants and embodiments of the invention which may be made by those skilled in the art without departing from the scope and range of equivalents of the invention.

What is claimed is:

1. Apparatus for controlling a laser, comprising:
   a first detector that monitors an amplitude of a laser light output by the laser;
   a filter that receives the laser light and outputs a filtered light having an amplitude that varies with the wavelength of the laser light;
   a second detector that monitors the amplitude of the filtered light;
   a transformer having a primary and a secondary, the primary being electrically coupled to the first and second detectors;
   a controller coupled to the secondary, the controller controlling the wavelength of the laser based on a voltage of the secondary of the transformer.

2. The apparatus of claim 1, wherein the primary of the transformer has a flux that is proportional to a difference between an output voltage of the first detector and an output voltage of the second detector.

3. The apparatus of claim 1, wherein:
   the primary of the transformer includes a first coil connected to the first detector and a second coil connected to the second detector, and
   the first and second coils of the primary are opposite in polarity from each other.

4. The apparatus of claim 1, wherein the transformer is one of the group consisting of a thin film transformer and a magnetic core.

5. The apparatus of claim 1,
   wherein the first detector provides a first signal to the primary, and the second detector provides a second signal to the primary,
   the apparatus further comprising an oscillator circuit for modulating the first and second signals.

6. The apparatus of claim 1, wherein the controller includes a thermoelectric cooler or a resistance heater.

7. The apparatus of claim 1, further comprising:
   an additional winding on a portion of the transformer other than the primary or the secondary, and
   a voltage source for applying an offset voltage to the additional winding to effect a gross temperature change in the laser.

8. The apparatus of claim 1, wherein the laser light passes from the laser to the first detector without an intervening filter.

9. The apparatus of claim 1, wherein the apparatus uses a single filter to control the wavelength of the laser.

10. The apparatus of claim 1, wherein the controller uniquely determines the laser wavelength as a function of the voltage of the secondary, and the transformer passively determines the voltage of the secondary.

11. The apparatus of claim 1, wherein the controller uniquely determines the temperature of the laser as a function of the voltage of the secondary, and the transformer passively determines the voltage of the secondary.

12. The apparatus of claim 3, further comprising an active amplifier having an input connected to the secondary of the transformer and an output connected to the controller.

13. The apparatus of claim 6, wherein the controller further includes a processor that is connected to receive an input signal from the secondary of the transformer, and provides an output signal that controls the thermoelectric cooler or resistance heater.

14. The apparatus of claim 7, wherein the offset voltage is selected based on an ambient temperature of the apparatus.

15. The apparatus of claim 7, wherein the laser has a plurality of channels, each channel having a respective wavelength, wherein a respectively different offset voltage is used for each respective channel.

16. The apparatus of claim 15, wherein the controller includes a thermoelectric cooler that is responsive to the voltage of the secondary of the transformer for effecting fine temperature changes in the laser.

17. Apparatus for controlling a laser, comprising:
first detecting means for detecting an amplitude of a laser light output by the laser;
filtering means for receiving the laser light and outputting a filtered light having an amplitude that varies with the wavelength of the laser light;
second detecting means for detecting the amplitude of the filtered light;
a transformer having a primary and a secondary, the primary being electrically coupled to the first and second detecting means; and
means for controlling the wavelength of the laser based on a voltage of the secondary of the transformer.

18. The apparatus of claim 17, wherein:
the first and second detecting means are photodiodes;
the controlling means include a thermoelectric cooler or a resistance heater;
the primary of the transformer includes a first coil connected to the first detector and a second coil connected to the second detector, the first and second coils of the primary being opposite in polarity from each other; and
the apparatus further comprises:
an oscillator circuit for modulating signals applied to the primary by the first and second detecting means;
an additional winding on a portion of the transformer other than the primary or the secondary, and
a voltage source for applying an offset voltage to the additional winding, to effect a gross temperature change in the laser.

19. A wavelength stabilized laser system, comprising:
a laser that produces a laser light having an amplitude and a wavelength that vary;
a first detector that provides a first signal representing the amplitude of the laser light;
a filter having a gain that is a function of the wavelength of the laser light, the filter receiving the laser light and outputting a filtered light having an amplitude that varies with the wavelength of the laser light;
a second detector that provides a second signal representing the amplitude of the filtered light;
a transformer having a primary and a secondary, the primary being electrically coupled to the first and second detectors;
a controller coupled to the secondary, the controller controlling the wavelength of the laser based on a voltage of the secondary of the transformer.

20. The system of claim 19, wherein the laser is a distributed Brag reflector laser, the apparatus further comprising a processor that generates and transmits a bias signal to the laser, the wavelength of the laser being based on both the bias signal and a temperature of the laser.

21. A method for controlling a laser, comprising the steps of:
detecting an amplitude of a laser light output by the laser;
filtering the laser light and outputting a filtered light having an amplitude that varies with the wavelength of the laser light;
detecting the amplitude of the filtered light;
providing signals representing the amplitude of the laser light and the amplitude of the filtered light to a primary of a transformer; and
controlling the wavelength of the laser based on a voltage of the secondary of the transformer.

22. The method of claim 21, wherein the step of providing signals includes:
providing the signal representing the amplitude of the laser light to a first coil of the primary; and
providing the signal representing the amplitude of the filtered light to a second coil of the primary, the first and second coils being opposite in polarity from each other.

23. The method of claim 21, further comprising:
amplifying the voltage of the secondary in an active amplifier and outputting the amplified voltage to the controller.

24. The method of claim 21, wherein the method further comprises:
modulating the signal representing the amplitude of the laser light and the signal representing the amplitude of the filtered light.

25. The method of claim 21, further comprising:
applying an offset voltage to an additional winding on a portion of the transformer other than the primary or the secondary, thereby to effect a gross temperature change in the laser, wherein the wavelength of the laser varies with the temperature of the laser.

26. The method of claim 21, wherein the step of controlling the wavelength includes:
providing the voltage of the secondary to a thermoelectric cooler to effect fine temperature changes in the laser, wherein the wavelength of the laser varies with the temperature of the laser.

27. The method of claim 24, further comprising:
dithering an oscillator that performs the modulating step to determine a local slope of a wavelength deviation to uniquely determine the wavelength of the laser.

* * * * *